United States Patent [19]
Jenkins

[11] 3,932,887
[45] Jan. 13, 1976

[54] TAPE MARKER
[75] Inventor: John P. Jenkins, Towanda, Ill.
[73] Assignee: International Tapetronics Corporation, Bloomington, Ill.
[22] Filed: July 18, 1974
[21] Appl. No.: 489,615

[52] U.S. Cl. .................................. 360/13; 360/128
[51] Int. Cl.² ......................................... G11B 27/02
[58] Field of Search ...................... 360/13, 14, 128

[56] References Cited
UNITED STATES PATENTS
2,744,755  5/1956  Dibbins .............................. 360/13
2,832,840  4/1958  Morin ................................. 360/13

Primary Examiner—James W. Moffitt
Attorney, Agent, or Firm—McCaleb, Lucas & Brugman

[57] ABSTRACT

A tape marker for a tape playing machine in which tape runs past a reproducing head in a housing compartment. The compartment has a door through which tape is inserted and withdrawn when the tape is changed or edited. A marking arm having an inked marking pad is pivoted to a sleeve which is mounted on a removable compartment cover so the tape marker and cover comprise a unitary sub-assembly. A pushbutton guided in the sleeve is connected to the marking arm by a double-pivoted link. Manual depression of the pushbutton swings the marking arm to press the ink pad against the tape. A narrow rib on the tape side of the pad prints a line on the tape at the exact center of the reproducing head. When the pushbutton is released, a return spring moves it outward and swings the marking arm and pad to a stored, out-of-the-way position providing clearance for the tape when inserted or withdrawn through the door.

5 Claims, 8 Drawing Figures

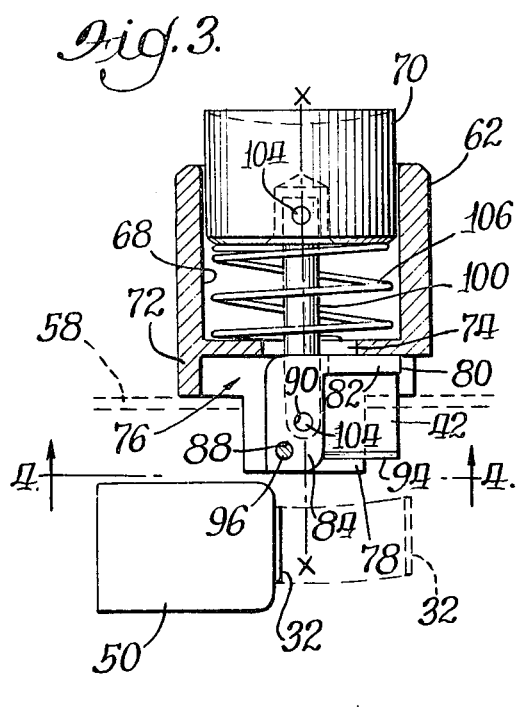
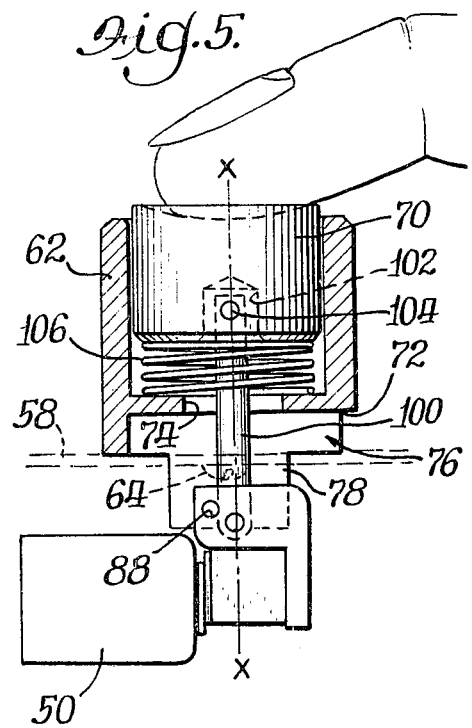
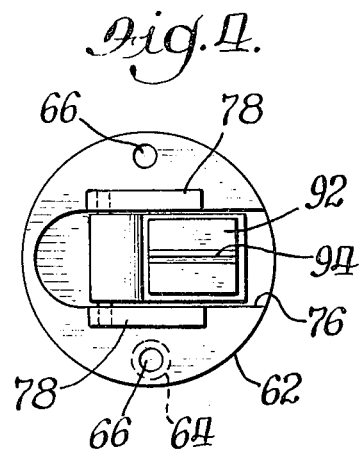
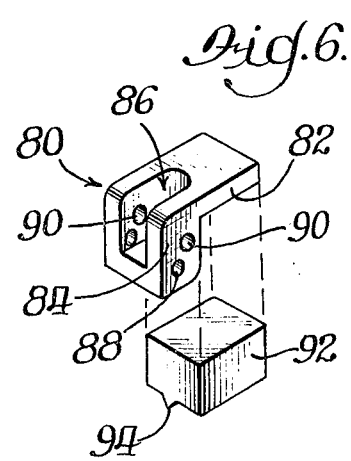
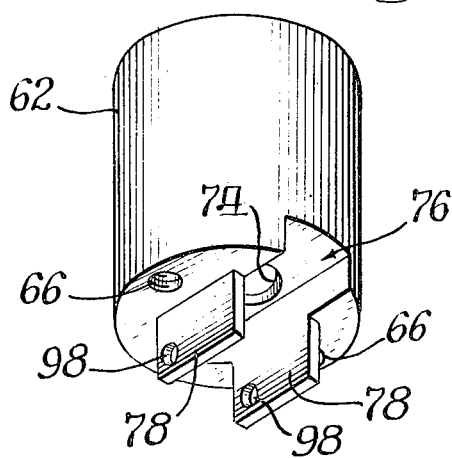
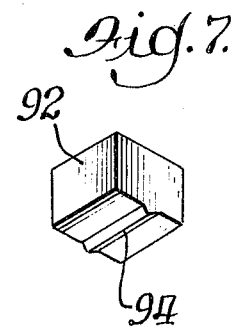

TAPE MARKER

CROSS REFERENCE TO RELATED APPLICATION

Reference is made to the following copending, related patent application, assigned to the same assignee:

Jenkins Appln. Ser. No. 489,614, Filed July 18, 1974 on MAGNETIC TAPE REPRODUCING APPARATUS WITH SOLENOID ACTUATED TAPE LIFTER MEANS AND AUTOMATIC CONTROL THEREFOR.

BACKGROUND OF THE INVENTION

The field of the invention is magnetic tape playback apparatus of the kind used in radio and television broadcasting.

There are many applications where a recorded tape must be edited, and specific locations be identified for the deletion and addition of recorded material. One example where this is required is in preparing raw taped news such as on-the-spot interviews for broadcast. Such tapes may be used only once and must be edited in a hurry. The fastest and most economical way of doing so is to play the tape and physically cut the tape and re-splice it with sections removed or added.

The precise pinpointing of recorded material on a tape requires some skill on the part of the editor who must guess where the tape should be cut. The work is almost always done under the pressure of time deadlines and requires more skill with the higher recording speeds. A timing miscalculation may result in cutting the tape at the wrong place and either losing a wanted section or not deleting an unwanted section.

BRIEF SUMMARY OF THE INVENTION

A general object of this invention is to provide a tape marker for a tape playing machine which is easily used by a relatively inexperienced person and which will precisely identify the location of the recorded material on the tape.

An important feature of the invention is that the operator can press a button and mark the tape with a clearly legible line precisely over the center of the reproducing head.

A further specific feature of the invention is that a tape marker arm and marking pad are moved into printing position against the tape in response to manual depression of a pushbutton, and are automatically moved to an out-of-the way, stored position to provide clearance for inserting and withdrawing the tape through an opening in the housing reproducing compartment.

BRIEF DESCRIPTION OF THE DRAWINGS

Other objects and advantages will be apparent from the following description taken in connection with the drawings in which:

FIG. 3 is a fragmentary enlarged cross-sectional view of FIG. 2 taken along line 3—3 showing the tape marker in out-of-the-way, stored position;

FIG. 4 is a fragmentary bottom view of FIG. 3 as seen in the direction of arrows 4—4;

FIG. 5 is a view similar to FIG. 3 showing the tape marker in marking position;

FIG. 6 is an exploded perspective view of the tape marking arm and inked marking pad;

FIG. 7 is a further perspective view of the inked marking pad; and

FIG. 8 is a lower perspective view of the housing sleeve shown in the previous figures.

Like parts are referred to by like reference characters throughout the figures of the drawings.

DETAILED DESCRIPTION OF THE PREFERRED EMBODIMENT

Figure 1:
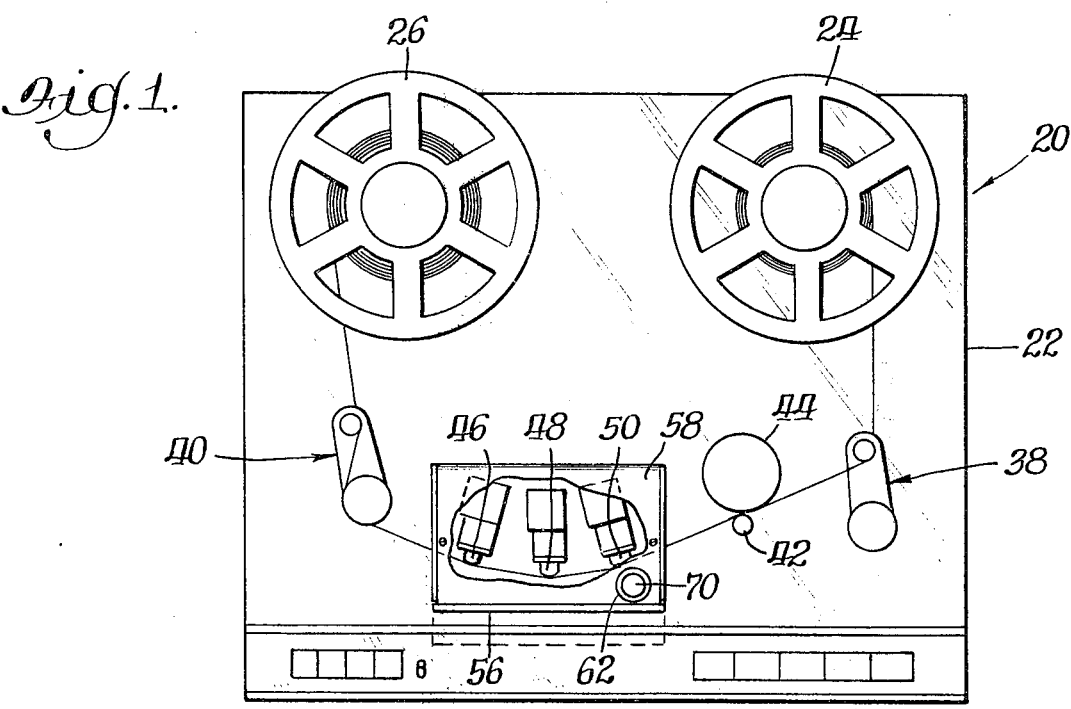
FIG. 1 is a top plan view of a recording and reproducing machine illustrating a preferred form of the present invention.

A recorder and reproducer 20 comprises a known form of housing 22 with forward and rewind reels 24 and 26 rotatably driven in the usual manner by individual torque motors (not shown). A magnetic recording tape 32 is trained for forward and rewind movement through a head compartment 36 which for the present purposes may be considered as part of the housing 22.

The tape is pulled taut by tensioning assemblies 38, 40 and is held at constant linear speed in play mode in the usual manner by frictional engagement between constant speed capstan 42 and pinch roller 44 while tape is wound on the foward reel 24.

The head compartment 36 completely encloses and shields erase, recording and reproducing heads 46, 48 and 50, respectively. The tape marker of the present invention is useful primarily with the reproducing head 50 with which the invention will be described. The housing compartment 36 includes side walls 52 with forwardly open slots 54 through which the tape runs between the reels. A front door 56 is in the upright, closed position shown in solid lines in FIG. 2 during recording or playback, and it may be opened to the broken line position in FIG. 2 to permit tape to be inserted in or withdrawn from the head compartment. The top and back of the head compartment are closed by a cover 58 held in place by screws 60.

The apparatus shown and described so far provides the environment for the present tape marking invention and has been described in detail in applicant's copending application Ser. No. 489,614 filed concurrently herewith entitled MAGNETIC TAPE REPRODUCING APPARATUS WITH SOLENOID ACTUATED TAPE LIFTER MEANS AND AUTOMATIC CONTROL THEREFOR, to which reference may be had for details.

As a further extension of the housing 22 and compartment 36, a housing sleeve 62 is fastened on the top of the cover 58 by screws 64 engaged in the tapped bores 66. The sleeve 62 has an upwardly open, external, cylindrical recess 68 within which a pushbutton 70 is slidably fitted. The bottom of the recess 68 is defined by an end wall 72 having a circular through hole 74 and a transverse slot 76 facing the interior of the housing head compartment 36. A pair of vertical guide plates 78 extend downwardly integral with the sleeve 62 and are transversely spaced to receive and retain a tape marker arm 80.

The tape marker arm 80 is generally L-shaped, comprising right-angled sections 82, 84. Section 84 has a central recess 86. The bottom solid portion of section 84 has a transverse bore 88 extending completely therethrough. Section 84 has aligned transverse bores 90 in an intermediate section, upwardly and to the right of bore 88 as shown in FIGS. 3 and 6.

A tape marker pad 92 is formed of a block of highly absorbent material such as felt or open-celled rubber or plastic material fastened on the tape marker arm by a suitable adhesive. The pad 92 comprises a major ink reservoir block with a relatively narrow rib 94 which functions as a marking edge.

The tape marker arm 80 is pivoted for movement between the out-of-the-way, stored position shown in FIG. 3 and the tape marking position shown in FIG. 5 by means of a pin 96 extending through the transverse bore 88 in the arm and through bores 98 in the vertical guide plates 78.

A link 100 comprises a straight rod pivotally connected at opposite ends to the pushbutton 70 and the arm 80. At its upper end, the link 100 is in an axial recess 102, pivoted on pin 104. The recess 102 is deliberately provided oversize with respect to the link enabling the latter to pivot freely as it moves between the FIG. 3 and FIG. 5 positions. The bottom end of the link 100 is in the recess 86 of arm 80, held by pivot pin 104 extending through a transverse bore (not numbered) in the link and bores 90 in the arm.

The through hole 74 in the base of the sleeve 62 is preferably made oversize to facilitate insertion and operation of the link 100.

A biasing spring 106 is compressibly interposed between the sleeve end wall 72 and the pushbutton 70 within the recess 68. By reason of the interconnection between the parts provided by the link 100, the spring 106 simultaneously moves the pushbutton and tape marker arm to the stored position shown in FIG. 3 when the pushbutton is released.

One of the advantages of the construction described is that the entire tape marker is carried on the cover 58 and is removable as a unit with it simply by loosening screws 60.

Use and operation of the invention are believed to be obvious in view of the foregoing description. Briefly, when the tape marker is not in use, the marker arm 80 and pad 92 are in an upper, out-of-the-way position partly above the level of the cover plate 58 as shown in FIG. 3. This provides a clear path for the insertion and removal of tape 32, as for example between the broken line and solid line positions shown in FIG. 3, when the door 56 is opened. When the operator locates a position on the tape which he wants to identify and mark, he stops the tape at the desired position, then presses the pushbutton 70 as shown in FIG. 5. The relatively narrow rib 94 is pressed against the tape leaving a clearly legible transverse line on it precisely centered on the reproducing head 50.

Figure 2:
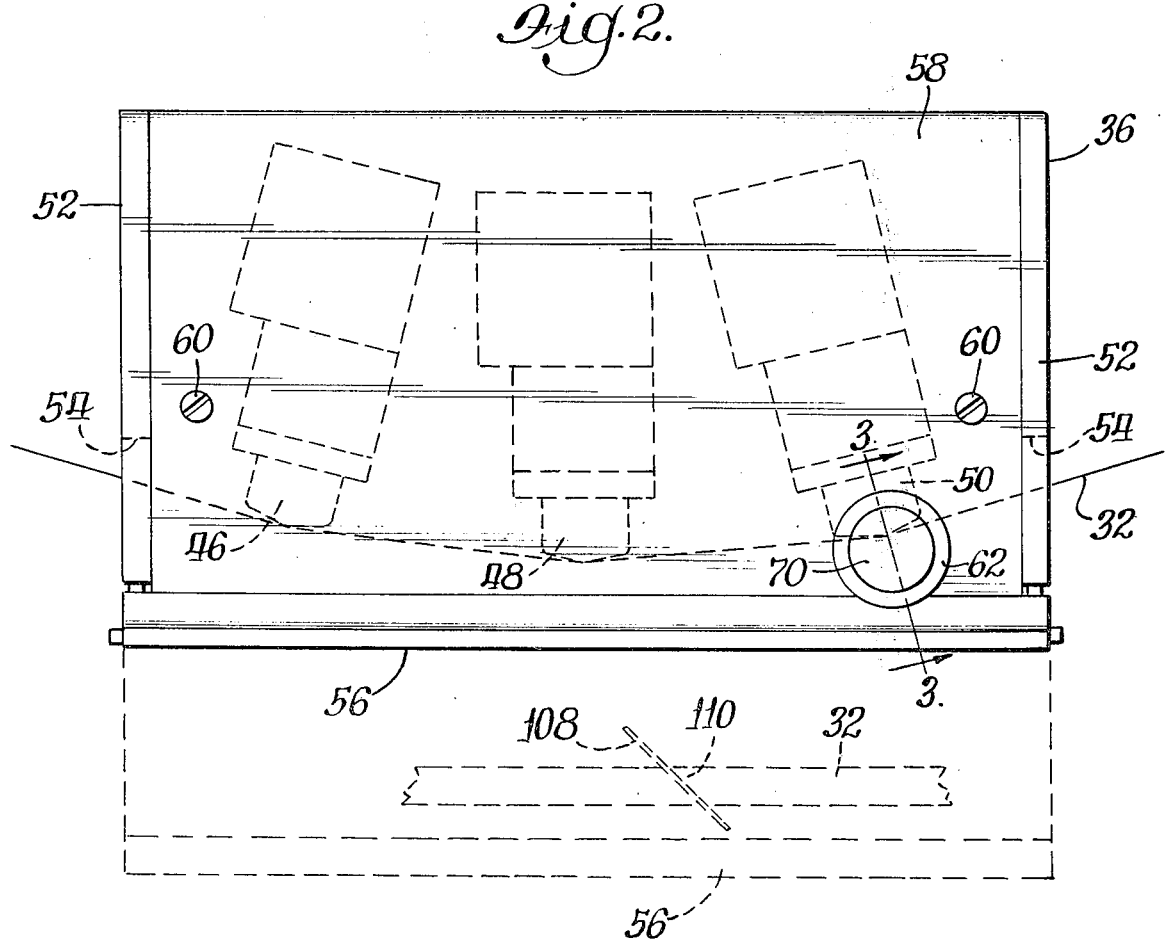
FIG. 2 is a fragmentary enlarged view of FIG. 1.

After making two such marks on the tape at locations defining a section to be deleted, the operator opens the door 56 to the broken line position shown in FIG. 2, pulls the tape out of the compartment 36 and cuts out the section to be discarded and splices the ends together. One convenient way of expediting this operation is to provide a diagonal groove 108 on the inner face of the door 56. By placing the tape 32 across the groove with the ink mark 110 at the groove, as shown in FIG. 2, the tape can be quickly cut by a knife or razor blade guided in the groove.

One important feature of the invention is that the center line X-X of the link 100 is closest to the pin 96 in the out-of-the-way stored position shown in FIG. 3 and significantly farther away in the marking position shown in FIG. 5. This provides a desirable increase in mechanical advantage, and therefore, pressure of the marking pad on the tape, in the FIG. 5 position. The spacing between pins 88 and 104 thus comprises a lever arm the length of which provides the desired marking pressure.

While one form in which the present invention may be embodied has been shown and described, it will be understood that various modifications may be made within the spirit and scope of the invention which should be limited only by the appended claims.

The embodiments of the invention in which an exclusive property or privilege is claimed are defined as follows:

1. In a tape reproducing machine, a tape trained for movement past a reproducing head in a housing compartment having an opening through which said tape is inserted into and withdrawn from playing position against said head, a tape marker comprising:
    a tape marking arm having an inked marking pad, said tape marking arm being pivotally mounted on the housing on a pivot axis laterally offset from one edge of of the tape when in said playing position for swinging movement between a marking position against the tape at the center of the reproducing head, and a stored, out-of-the-way position laterally of said edge of the tape providing open clearance for tape while being inserted through said housing compartment opening along a line of direct approach to the face of the reproducing head, and pushbutton means for actuating said tape marking arm.

2. In a tape reproducing machine, a tape marker according to claim 1 in which said pad comprises a block of ink absorbent material functioning as an ink reservoir, and said pad has a relatively narrow tape engaging rib for applying a linear marking to the tape in said marking position.

3. In a tape reproducing machine, a tape marker according to claim 1 in which said housing includes an elongated sleeve having an external recess,
    said pushbutton means includes a pushbutton connected to said tape marking arm and manually movable inwardly within said recess to move said arm to its said marking position, and
    spring means simultaneously urging said pushbutton outwardly and urging said tape marking arm toward its said stored position.

4. In a tape reproducing machine, a tape marker according to claim 3 in which said pushbutton and said tape marking arm are pivotally connected to opposite ends of a link, and said spring means is a compression spring in said recess having opposite ends seated respectively against said pushbutton and the inner end of said sleeve.

5. In a tape reproducing machine having a housing with a tape trained for movement past a reproducing head in a housing compartment having an opening through which said tape is inserted into and withdrawn from playing position against said head, a tape marker comprising:
    a tape marking arm having an inked marking pad pivotally mounted on the housing for swinging movement between a marking position against the tape at the center of the reproducing head, and a stored, out-of-the-way position providing clearance for tape inserted through said housing compartment opening; and
    pushbutton means including a pushbutton guided for inward and outward movement in said housing and a straight rod link having a longitudinal axis being pivotally connected at opposite ends to said pushbutton and tape marking arm respectively, and spring means between said pushbutton and said housing for simultaneously urging said pushbutton outwardly while urging said tape marking arm toward its said stored position, said pushbutton being manually movable inwardly to move said arm to its said marking position;

said rod being pivoted to said tape marker arm at a position enabling the distance of said axis from the pivotal connection between the tape marker arm and housing to increase as the tape marker arm is moved from stored to marking position by said pushbutton, whereby the mechanical advantage between said pushbutton and tape marker arm is significantly increased as the tape marker arm is moved from said stored position to said marking position.

* * * * *